(12) United States Patent
Gabrielsson

(10) Patent No.: US 10,279,313 B2
(45) Date of Patent: May 7, 2019

(54) METHOD, MULTIFUNCTIONAL FILTER AND SYSTEM FOR THE REMOVAL OF PARTICULATE MATTER AND NOXIOUS COMPOUNDS FROM ENGINE EXHAUST GAS

(71) Applicant: Umicore AG & Co. KG, Hanau-Wolfgang (DE)

(72) Inventor: Pär L. T. Gabrielsson, Helsingborg (SE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 15/574,756

(22) PCT Filed: May 12, 2016

(86) PCT No.: PCT/EP2016/060682
§ 371 (c)(1),
(2) Date: Nov. 16, 2017

(87) PCT Pub. No.: WO2016/184774
PCT Pub. Date: Nov. 24, 2016

(65) Prior Publication Data
US 2018/0169581 A1  Jun. 21, 2018

(30) Foreign Application Priority Data
May 19, 2015  (DK) .................................. 2015 70290

(51) Int. Cl.
| | | |
|---|---|---|
| *B01D 53/94* | (2006.01) | |
| *B01D 53/90* | (2006.01) | |
| *B01J 21/06* | (2006.01) | |
| *B01J 23/22* | (2006.01) | |

(Continued)

(52) U.S. Cl.
CPC ......... *B01D 53/9418* (2013.01); *B01D 53/90* (2013.01); *B01D 53/944* (2013.01);
(Continued)

(58) Field of Classification Search
CPC ............ B01D 46/0027; B01D 46/0061; B01D 53/9418; B01D 53/9427; B01D 53/9431; B01D 53/944; B01D 53/9468; B01D 2201/62; B01D 2239/0478; B01D 2239/065; B01D 2251/2067;
(Continued)

(56) References Cited

U.S. PATENT DOCUMENTS 8,147,762 B2 * 4/2012 Doring .................. F01N 3/0222
422/173
2008/0256936 A1  10/2008 Zuberi
(Continued)

FOREIGN PATENT DOCUMENTS

DE  10 2005 005 663 A1  8/2006
DE  10 2008 038 736 A1  2/2010
(Continued)

*Primary Examiner* — Timothy C Vanoy
(74) *Attorney, Agent, or Firm* — Suzannah K. Sundby, Esq.

(57) ABSTRACT

A multifunctional wall flow filter and a system having same performing removal of noxious compounds comprising nitrogen oxides, volatile organic compounds and carbon monoxide and particulate matter from exhaust gas of a compression ignition engine is disclosed.

17 Claims, 1 Drawing Sheet

(51) Int. Cl.
*B01J 23/30* (2006.01)
*B01J 23/42* (2006.01)
*B01J 23/44* (2006.01)
*B01J 29/76* (2006.01)
*B01J 29/85* (2006.01)
*F01N 3/035* (2006.01)
*F01N 3/10* (2006.01)
*F01N 3/20* (2006.01)

(52) U.S. Cl.
CPC .............. *B01J 21/063* (2013.01); *B01J 23/22* (2013.01); *B01J 23/30* (2013.01); *B01J 23/42* (2013.01); *B01J 23/44* (2013.01); *B01J 29/763* (2013.01); *B01J 29/85* (2013.01); *F01N 3/035* (2013.01); *F01N 3/103* (2013.01); *F01N 3/106* (2013.01); *F01N 3/2066* (2013.01); *B01D 2257/404* (2013.01); *B01D 2257/502* (2013.01); *B01D 2257/708* (2013.01); *F01N 2510/0682* (2013.01); *F01N 2510/0684* (2013.01); *F01N 2610/02* (2013.01); *Y02T 10/24* (2013.01)

(58) Field of Classification Search
CPC ...... B01D 2255/9155; B01D 2257/402; B01D 2257/404; B01D 2257/502; B01D 2257/708; B01D 2258/012; B01D 2279/30; F01N 3/0231; F01N 3/035; F01N 3/103; F01N 3/2066; F01N 2250/02; F01N 2570/10; F01N 2570/14; F01N 2610/02
See application file for complete search history.

(56) References Cited

U.S. PATENT DOCUMENTS

| | | | |
|---|---|---|---|
| 2010/0175372 A1* | 7/2010 | Lambert | B01D 53/9472 60/297 |
| 2011/0047991 A1 | 3/2011 | Kato | |
| 2012/0247092 A1 | 10/2012 | Boorse | |
| 2013/0276432 A1 | 10/2013 | Crehan | |
| 2014/0140899 A1* | 5/2014 | Gabrielsson | B01D 53/9468 422/171 |
| 2014/0170033 A1* | 6/2014 | Gabrielsson | B01D 53/9468 422/181 |
| 2014/0271385 A1* | 9/2014 | Andreasson | F01N 3/106 422/169 |
| 2014/0271423 A1* | 9/2014 | Andreasson | B01D 53/9431 423/212 |
| 2015/0004068 A1* | 1/2015 | Andreasson | F01N 3/2066 422/171 |
| 2015/0010451 A1* | 1/2015 | Andreasson | F01N 3/2066 423/213.5 |
| 2015/0202572 A1* | 7/2015 | Chiffey | B01J 23/66 423/213.5 |
| 2018/0008964 A1* | 1/2018 | Castellino | B01J 23/6482 |
| 2018/0029029 A1* | 2/2018 | Chiffey | B01J 37/0244 |
| 2018/0045097 A1* | 2/2018 | Tang | B01D 53/9418 |

FOREIGN PATENT DOCUMENTS

| | | |
|---|---|---|
| EP | 2 522 419 A1 | 11/2012 |
| WO | WO 2010/004320 A2 | 1/2010 |

* cited by examiner

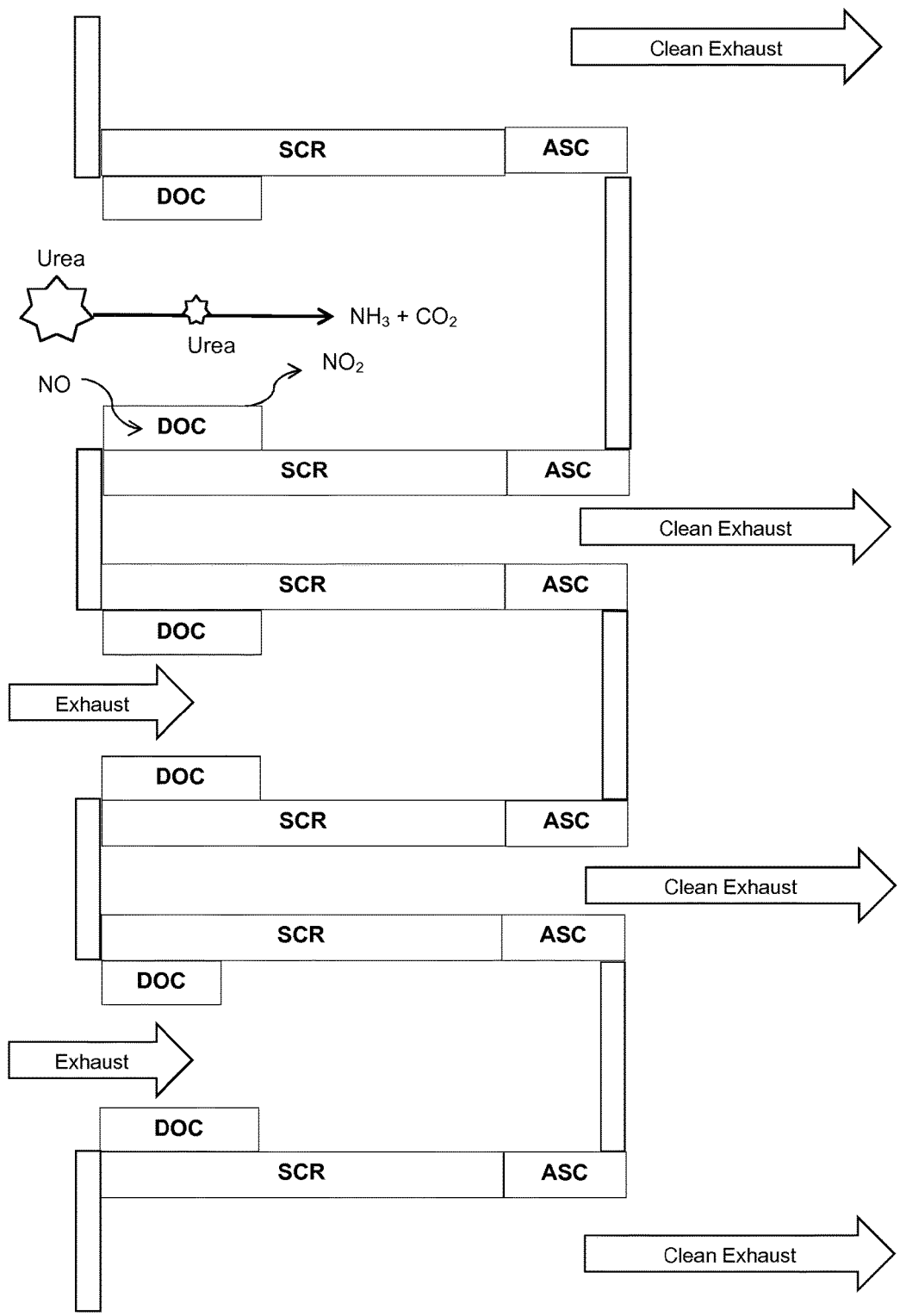

METHOD, MULTIFUNCTIONAL FILTER AND SYSTEM FOR THE REMOVAL OF PARTICULATE MATTER AND NOXIOUS COMPOUNDS FROM ENGINE EXHAUST GAS

BACKGROUND OF THE INVENTION

1. Field of the Invention

The present invention relates to a method, multifunctional filter and system for reducing emission of nitrogen oxides (NOx) and particulate matter present in the exhaust from a lean burning internal compression ignition engine.

2. Description of the Related Art

The exhaust system of modern cars with lean burning engines is typically equipped with an oxidation catalyst, a particulate filter and a catalyst for the selective reduction of NOx (SCR) in presence of a reduction agent.

Oxidation catalysts being active in the oxidation of volatile organic compounds and carbon monoxide and SCR catalysts are known in the art and disclosed in numerous publications.

Typically employed particulate filters (DPF) in diesel exhaust gas cleaning systems, are wall flow filters with a plurality if inlet and outlet channels. The inlet channels are closed at their outlet side and the outlet channels are closed at their inlet side, so that the gas flowing into the filter is forced through porous walls defining the channels, whereby particulate matter is filtered off from the gas.

To meet future emission regulations for diesel passenger cars and trucks requires usage of both diesel particulate filter technology and NOx reduction catalyst. Due to its potential for fuel optimization and high efficiency in NOx removal, SCR is often the preferred technology for NOx reduction. DOC (diesel oxidation catalyst), DPF (diesel particulate filter) and SCR (selective catalytic reduction) catalysts are combined sequentially in the exhaust system but such sequential system configurations have several drawbacks: 1) large volume; 2) insufficient temperature for the SCR catalyst during cold start when DPF is placed in front of SCR; and 3) unfavourable conditions for passive filter regeneration (lower NO2 and temperature) if SCR is placed upstream of the DPF.

Particulate matter accumulated on the filter walls at inlet side of the filter must be removed either by active regeneration, wherein particulate matter is catalytically burned off in contact with an oxidation catalyst supported on the filter walls in combination with oxygen in exhaust gas at increased exhaust gas temperatures or by non-catalytic passive regeneration.

Passive filter regeneration is facilitated by oxidation of carbon at 250° C.–450° C. with NO2 formed on an upstream DOC by the following reactions

  (1)

  (2)

And as the particulate matter typically contains a hydrocarbon as SOF (Soluble Organic Fraction), here typified as the hydrocarbon "CH"

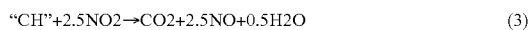  (3)

The fast SCR reaction

  (4)

competes with the above carbon reactions for the availability of NO2.

The problems can potentially be solved by integrating the DOC and SCR catalysts into the particulate filter as one multifunctional unit.

One of the challenges of integrating the oxidation function into one unit is that it might consume or oxidize ammonia reductant before it reaches the SCR catalyst. The DOX is important for the production of NO2 from NO which is used to oxidize the soot in the soot filter. The oxidation of the soot by NO2 keeps the filter clean and assures a low pressure drop in the system.

SUMMARY OF THE INVENTION

The solution according to the invention is that only the inlet of the filter is zone coated with the DOC functionality. NO, which is a gas, will diffuse down into the catalytic material and react to NO2, while the urea, which is used as a precursor for NH3 and is a liquid will pass through the zone with the DOC and hydrolyse to NH3 after the DOC, as shown in FIG. 1. The upper layer of the DOC might be passivated by adding a thin coat of a more inert material, which does not react with the urea.

DESCRIPTION OF THE DRAWING

FIG. 1 schematically shows that only the inlet of the filter is zone coated with the DOC functionality, and NO, which is a gas, will diffuse down into the catalytic material and react to NO2, while urea, which is used as a precursor for NH3 and is a liquid, will pass through the zone with the DOC and hydrolyse to NH3 after the DOC.

DETAILED DESCRIPTION OF THE INVENTION

Thus, a first aspect of the invention resides in a method for the removal of noxious compounds and particulate matter from exhaust gas of a compression ignition engine comprising in series the steps of (a) adding an amount of SCR reductant in form of droplets of an aqueous urea solution to the exhaust gas;

(b) introducing the exhaust gas admixed with the droplets of the aqueous urea solution into inlet channels of a wall flow filter and oxidizing the volatile organic compounds and carbon monoxide to carbon dioxide and water and nitrogen monoxide to nitrogen dioxide in presence of an oxidation catalyst arranged on permeable porous partition walls at inlet side of the wall flow filter;

(c) subsequently evaporating and decomposing the droplets of the aqueous urea solution in the exhaust gas from step (b) to ammonia;

(d) passing the exhaust gas containing the ammonia through the permeable porous partition walls of the wall flow filter to outlet channels of the filter and capturing the particulate matter on surface of the permeable porous partition walls facing the inlet channels of the filter; (e) removing continuously the captured particulate matter by reaction with the nitrogen dioxide contained in the exhaust gas; and (f) subsequently removing remaining amounts of nitrogen dioxide from the exhaust gas by reaction with the ammonia in presence of an SCR active catalyst arranged within the gas permeable porous partition walls and/or on wall side facing the outlet channels of the wall flow particle filter.

A second aspect of the invention is multifunctional wall flow filter for cleaning exhaust gas from a compression ignition engine comprising a plurality of exhaust gas inlet flow channels and a plurality of exhaust gas outlet channels separated by gas permeable porous partition walls;

a diesel oxidation catalyst applied in the exhaust gas inlet flow channels on the partition walls at exhaust gas inlet side; and an SCR catalyst for selective reduction of nitrogen oxides applied within the partition walls and/or on surface of the partition walls facing the outlet channels in a region between the exhaust gas inlet side and outlet side, wherein upper layer of the diesel oxidation catalyst is passivated with a coat of an inert material.

A third aspect of the invention is a system for cleaning exhaust gas from a diesel engine comprising an injector and a downstream multifunctional wall flow filter with a plurality of exhaust gas inlet flow channels and a plurality of exhaust gas outlet channels separated by gas permeable porous partition walls;

a diesel oxidation catalyst applied in the exhaust gas inlet flow channels on the partition walls at exhaust gas inlet side; and an SCR catalyst for selective reduction of nitrogen oxides applied within the partition walls and/or on surface of the partition walls facing the outlet channels in a region between the exhaust gas inlet side and outlet side, wherein the injector is adapted to inject droplets of a urea-water-solution into exhaust gas upstream of the multifunctional wall flow filter so that the urea-water-solution comes in contact with the diesel oxidation catalyst in liquid form or the injector is arranged at a distance to the inlet of multifunctional wall flow filter resulting in a droplet size of the urea-water-solution so that the urea-water-solution comes in contact with the diesel oxidation catalyst in liquid form.

At the typical distance of 0.5 m from the injector to the multifunctional wall flow filter as in the case of diesel vehicles, it is necessary to provide the size of the droplets to at least 7 micrometers in order to prevent gasification of the droplets in the gas phase upstream of the filter and within the DOC.

With a droplet size of the urea-water-solution larger less than 7 micrometers the distance of the injector must be reduced to below 0.5 meters in order to prevent evaporation of the solution within the DOC.

The further advantages of the method, the multifunctional filter and the system according to the above aspects of the invention are besides physical separation, a thermal decoupling of the particulate matter and NOx reactions, as NO2 is primarily needed for the fast SCR reaction in the temperature range of 180° C.-280° C. while NO2 for passive particulate matter combustion is needed in the range of 280° C.-450° C. During a vehicle cold start, the NO2 will therefore be fully available for the needed NOx conversion, and the combustion of accumulated particulate matter can wait for the system to be heated up.

Further preferred embodiments of the invention are disclosed in the dependent claims.

Suitable oxidation and SCR catalysts for use in the invention are well known in the art.

To name a few, vanadium-based catalyst formulations of the family V2O5/WO3/TiO2 have shown high deNOx performance and durability. Copper and iron zeolites with the beta framework have been commercialized for some years and are currently used as SCR catalyst for diesel exhaust clean-up. Cu-zeolite types with the chabazite structure have a promising combination of high-temperature stability and high low-temperature activity. Of those, Cu-SAPO-34 and Cu-SSZ-13 SCR catalysts are preferred.

Oxidation catalysts forming nitrogen dioxide for use in the invention are platinum or mixtures of platinum and palladium. These metals are deposited on alumina and/or titania and or silica. Stabilisation with rare earth metal oxides can be beneficial.

The invention claimed is:

1. A method for the removal of noxious compounds comprising nitrogen oxides, volatile organic compounds and carbon monoxide and particulate matter from exhaust gas of a compression ignition engine comprising in series the steps of
    (a) adding an amount of SCR reductant in form of droplets of an aqueous urea solution to the exhaust gas;
    (b) introducing the exhaust gas admixed with the droplets of the aqueous urea solution into inlet channels of a wall flow filter and oxidizing the volatile organic compounds and carbon monoxide to carbon dioxide and water and nitrogen monoxide to nitrogen dioxide in presence of an oxidation catalyst arranged on permeable porous partition walls at inlet side of the wall flow filter, the oxidation catalyst active in;
    (c) subsequently evaporating and decomposing the droplets of the aqueous urea solution in the exhaust gas from step (b) to ammonia;
    (d) passing the exhaust gas containing the ammonia through the permeable porous partition walls of the wall flow filter to outlet channels of the filter and capturing the particulate matter on surface of the permeable porous partition walls facing the inlet channels of the filter;
    (e) removing continuously the captured particulate matter by reaction with the nitrogen dioxide contained in the exhaust gas; and
    (f) subsequently removing remaining amounts of nitrogen dioxide from the exhaust gas by reaction with the ammonia in presence of an SCR active catalyst arranged within the gas permeable porous partition walls and/or on wall side facing the outlet channels of the wall flow particle filter.

2. The method of claim 1, further comprising a step of removing excess of ammonia contained in the exhaust gas by contact with an ammonia slip catalyst arranged at outlet of the outlet channels of the wall flow filter.

3. The method of claim 1, wherein droplet size of the aqueous urea solution is at least 7 micrometer.

4. The method according to claim 1, wherein the SCR catalyst comprises oxides of vanadium and/or tungsten and titania.

5. The method according to claim 1, wherein the SCR active catalyst comprises one or more copper or iron promoted beta-zeolites.

6. The method according to claim 1, wherein the SCR active catalyst comprises copper promoted SAPO-34 and/or copper promoted SSZ-13.

7. The method according to claim 1, wherein the oxidation catalyst comprises platinum and/or palladium.

8. The method according to claim 2, wherein the ammonia slip catalyst comprises platinum and CuSAPO-34 and/or SSZ-13.

9. Multifunctional wall flow filter for cleaning exhaust gas from a compression ignition engine comprising
    a plurality of exhaust gas inlet flow channels and a plurality of exhaust gas outlet channels separated by gas permeable porous partition walls;
    a diesel oxidation catalyst applied in the exhaust gas inlet flow channels on the partition walls at exhaust gas inlet side; and
    an SCR catalyst for selective reduction of nitrogen oxides applied within the partition walls and/or on surface of the partition walls facing the outlet channels in a region between the exhaust gas inlet side and outlet side,
wherein upper layer of the diesel oxidation catalyst is passivated with a coat of an inert material.

10. Multifunctional wall flow filter according to claim 9, wherein the outlet side of the outlet channels is additionally provided with an ammonia slip catalyst.

11. Multifunctional wall flow filter according to claim 9, wherein the SCR catalyst comprises, oxides of vanadium and/or tungsten and titania.

12. Multifunctional wall flow filter according to claim 9, wherein the SCR active catalyst comprises one or more copper or iron promoted beta-zeolites.

13. Multifunctional wall flow filter according to claim 9, wherein the SCR catalyst comprises copper promoted SAPO-34 and/or copper promoted SSZ-13.

14. Multifunctional wall flow filter according to claim 9, wherein the oxidation catalyst comprises platinum and/or palladium.

15. Multifunctional wall flow filter according to claim 10, wherein the ammonia slip catalyst comprises platinum and CuSAPO-34 and/or SSZ-13.

16. Multifunctional wall flow filter according to claim 9, wherein the coat of an inert layer comprises a material, which does not hydrolyse urea to ammonia.

17. A system for cleaning exhaust gas from a diesel engine comprising
- an injector and a downstream multifunctional wall flow filter with a plurality of exhaust gas inlet flow channels and a plurality of exhaust gas outlet channels separated by gas permeable porous partition walls;
- a diesel oxidation catalyst applied in the exhaust gas inlet flow channels on the partition walls at exhaust gas inlet side; and
- an SCR catalyst for selective reduction of nitrogen oxides applied within the partition walls and/or on surface of the partition walls facing the outlet channels in a region between the exhaust gas inlet side and outlet side,
- wherein the injector is adapted to inject droplets of a urea-water-solution into exhaust gas upstream of the multifunctional wall flow filter so that the urea-water-solution comes in contact with the diesel oxidation catalyst in liquid form or the injector is arranged at a distance to the inlet of multifunctional wall flow filter resulting in a droplet size of the urea-water-solution so that the urea-water-solution comes in contact with the diesel oxidation catalyst in liquid form.

* * * * *